(12) United States Patent
Greger

(10) Patent No.: US 7,533,188 B1
(45) Date of Patent: May 12, 2009

(54) SYSTEM AND METHOD FOR STAGGERING THE START TIME OF SCHEDULED ACTIONS FOR A GROUP OF NETWORKED COMPUTERS

(75) Inventor: Thomas Greger, Lehi, UT (US)

(73) Assignee: Novell, Inc., Provo, UT (US)

( * ) Notice: Subject to any disclaimer, the term of this patent is extended or adjusted under 35 U.S.C. 154(b) by 858 days.

(21) Appl. No.: 11/062,454

(22) Filed: Feb. 22, 2005

(51) Int. Cl.
*G06F 15/16* (2006.01)
(52) U.S. Cl. .................... 709/248; 709/220; 709/223
(58) Field of Classification Search .................. 709/248
See application file for complete search history.

(56) References Cited

U.S. PATENT DOCUMENTS

2004/0243922 A1* 12/2004 Sirota et al. ................. 715/500

* cited by examiner

*Primary Examiner*—Larry D Donaghue
*Assistant Examiner*—Ryan J Jakovac
(74) *Attorney, Agent, or Firm*—Pillsbury Winthrop Shaw Pittman LLP

(57) ABSTRACT

A system and method are provided for staggering the start time of scheduled actions for a group of networked addressable devices. A time period in which a scheduled action is to be performed may be determined. The time period may be divided into timeslots based on the number of addressable devices in the network. Based, at least in part, on a unique characteristic associated with each addressable device, a unique staggered start time may be assigned to each addressable device.

11 Claims, 4 Drawing Sheets

SYSTEM AND METHOD FOR STAGGERING THE START TIME OF SCHEDULED ACTIONS FOR A GROUP OF NETWORKED COMPUTERS

FIELD OF THE INVENTION

The invention relates to staggering actions to be performed on a group of computers sharing a common characteristic.

BACKGROUND OF THE INVENTION

In a network computing environment, many actions take place automatically for multiple computers during scheduled time periods. For example, these actions include installing software applications, upgrades, and patches, running virus scan programs, routine maintenance, and/or other scheduled actions. Typically, these actions are scheduled to start at a specific time.

Various problems may occur when a large number of computers access resources to perform an action at the same time. For example, a high network load may occur resulting in network congestion. Other problems may also occur.

Some systems have attempted to overcome these problems by specifying a time period for the action and enabling computers or users to select a "random" time within the specified time period for the action to be performed. However, in such cases, the "random" mechanism must be invoked on each individual computer and therefore computers can still end up performing the action at or about the same time. Furthermore, due to the randomized start times, the behavior of the computers on the network may become unpredictable depending on the time period.

These and other drawbacks exist.

SUMMARY OF THE INVENTION

According to various embodiments of the invention, a mechanism may be provided for staggering the commencement of one or more common actions to be performed by a group of addressable devices over a designated time period. As such, the randomness factors can be avoided and more predictable distribution may be obtained. The system and method of the present invention may utilize a unique characteristic associated with each addressable device to determine unique start time for commencing the common action at each addressable device.

A system implementing various aspects of the invention may include some or all of the following components. A server may communicate with a plurality of addressable devices over one or more networks. The server may include one or more modules such as an actions module for maintaining a schedule of actions to be performed by the plurality of addressable devices. According to some embodiments of the invention, the server may include a mechanism for informing each addressable device of pending actions.

According to some embodiments of the invention, a unique start time for commencing an action may be determine for each addressable device based in part on a unique characteristic associated with the device and a value related to the number of addressable devices in the group. A time period for performing the action may be determined and the time period may be divided into timeslots based on the number of addressable devices in the group.

According to some embodiments of the invention, the group is a network of addressable devices sharing a common network address characteristic, such as belonging to the same subnet.

According to some embodiments of the invention, unique starting times may be determined individually be each device. In other embodiments, unique starting times may be determined at a central location and each device may be notified of its unique starting time. In still other embodiments of the invention, the unique starting time for each device may be determined at a central location, and the action may be commenced at the designated time without requiring the device to take any actions.

According to some embodiments of the invention, a unique starting time for each device in the group may be determined by deriving a value related to the number of addressable devices in the group and deriving a timeslot number based on the number of devices and a unique characteristic associated with the device. An offset time may be derived for each device based on the timeslot number and the offset time may be added to the beginning of the time period to determine the unique starting time for each device.

According to an exemplary embodiment of the invention, the plurality of addressable devices may be part of an internet protocol (IP) network having associated with it a subnet address. Each addressable device may have associated with it a unique IP address. Using the subnet address, the number of addressable devices in the network may be determined. An operation may be performed between a value representing the number of addressable devices in the network and the IP address of each device.

A time period in which an action is to be performed may be determined, and the length of the time period may be divided by the number of addressable devices to determine the length of each time slot. An offset for each addressable device may be calculated by multiplying the result of the operation between the IP address and the value representing the number of addressable devices by the length of each time slot. The unique starting time for each device may then be determined by adding the offset time to the beginning of the time frame.

These and other objects, features, and advantages of the invention will be apparent through the following detailed description and the drawings attached hereto. It is also to be understood that both the foregoing general description and the following detailed description are exemplary and not restrictive of the scope of the invention.

DETAILED DESCRIPTION OF PREFERRED EMBODIMENTS

Figure 1:
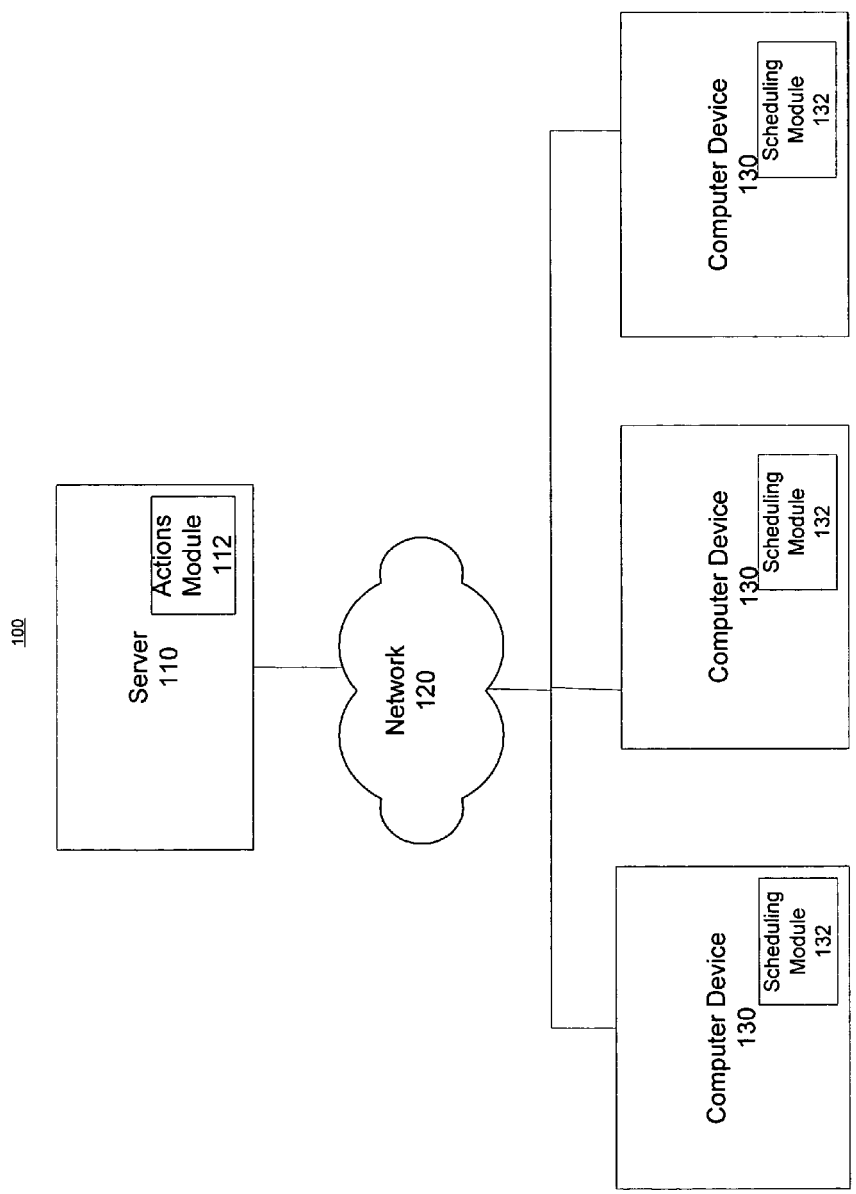
FIG. 1 illustrates a system which may implement various embodiments of the invention.

According to various embodiments of the invention, a system may be provided for staggering the commencement of one or more actions to be performed by a plurality of addressable devices belonging to a group. Each action to be performed by the plurality of devices may be the same or a similar action. For example, different devices may require different versions of a program to be run to perform a specified action. FIG. 1 illustrates a system 100 wherein each of a plurality of addressable devices may determine a unique time for commencing an action based, in part, on a unique characteristic associated with each addressable device, according to some embodiments of the invention. System 100 may include a server 110 and a plurality of addressable devices 130. Server 110 may be or include, for example, a workstation running Microsoft Windows NT, Unix, Novell Netware, and/or other operating systems. Addressable devices 130 may be any type of addressable device such as, for example, a desktop computer, a laptop computer, a handheld portable computer device, a mobile telephone, and/or any other addressable device.

Each addressable device 130 may be a member of a group. For example, the group may be a group of addressable devices that are part of a specified network, belong to the same organization department, or otherwise share a common attribute. According to an exemplary embodiment of the invention, the group may be a network having an assigned subnet address representing the number of addressable devices that may be a part of the network. As illustrated in FIG. 1, server 110 may communicate with addressable devices 130 over one or more networks 120. Network 120 may include a local area network, the Internet, an intranet, a wireless network, and/or other networks.

Server 110 may include one or more modules, such as actions module 112. Actions module 112 may maintain a list of actions to be performed at specified times by one or more addressable device 130. For example, the list of actions may be created by a group administrator, automatically created by applications located on server 110, or otherwise created. Actions may include, for example, installing software applications, upgrades, and patches, running virus scans, routine maintenance, and/or other actions.

According to some embodiments of the invention, actions may be device driven. As such, actions module 112 may include a mechanism for providing a notification to each addressable device 130 regarding one or more pending actions. The notification may include, for example, the time frame in which the action may be performed, directions for determining a unique start time, directions for completing the action and/or other information. In other embodiments of the invention, actions may be server driven wherein the server initiates the action on each addressable device 130.

According to some embodiments of the invention, each client device 130 may include one or more modules, such as scheduling module 132. Each device may be aware of a unique characteristic associated with the device and a common characteristic associated with the group of devices. Each scheduling module 132 may use knowledge of these characteristics to determine a unique time for commencing a scheduled action. Scheduling module 132 may receive notification of pending actions from actions module 112.

Figure 2:
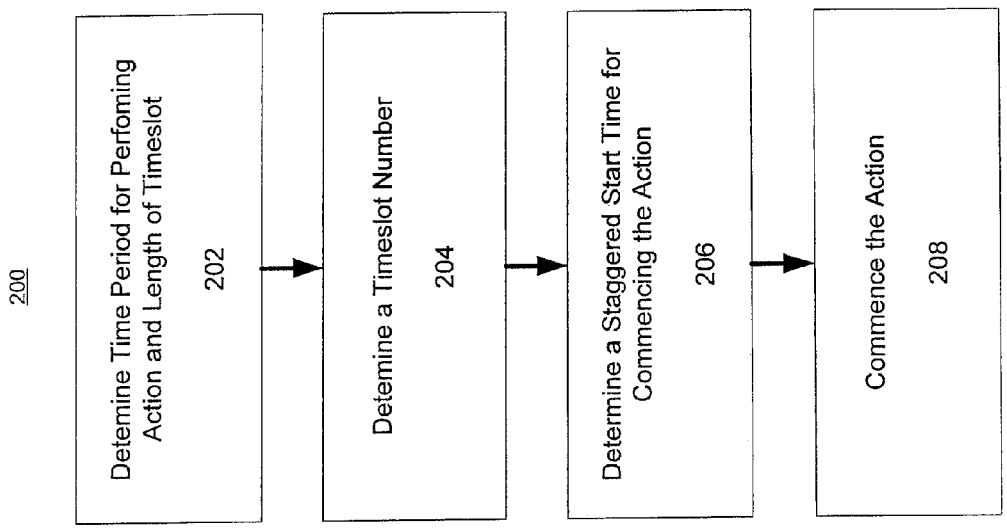
FIG. 2 illustrates a process for determining a start time for performing a scheduled action, according to various embodiments of the invention.

According to some embodiments of the invention, each addressable device may determine its own unique start time, as depicted by process 200 in FIG. 2. Each addressable device may determine a time period in which an action is to be determined, as depicted at 202. This information may be provided to each addressable device as a notification from the server, or may otherwise be communicated to each addressable device. The time period may be divided into timeslots of a specific length based, at least in part, on the number of addressable devices in the group. For example, the group may be a network of addressable devices sharing a common subnet address. The subnet address may be used to determine the number of devices in the network.

Some addressable devices in the group may not need to perform a specified action or may be disconnected during the time period for performing the action. According to some embodiments of the invention, disconnected devices may not be considered when determining the length of the timeslots. In other embodiments, all devices in the group may be used in determining the timeslot lengths.

According to some embodiments of the invention, one or more actions may be event driven. That is, a time for commencing an action may be determined based on if and when an event occurs, such as, for example, a user logging into the device.

As depicted at 204, a timeslot number may be determined by each addressable device. The timeslot number may be determined based, in part, on one or more unique characteristics associated with the addressable device and a common characteristic associated with the group. For example, for a group of computers belonging to a network, the common characteristic may be the subnet address. The unique characteristic may then be based on the network address associated with the addressable device, such as an internet protocol (IP address).

According to some embodiments of the invention, a unique timeslot number may be determined by each addressable device. However, in other embodiments, timeslot numbers may be shared by two or more addressable devices in the group. For example, addressable devices may belong to one or more subgroups such as a certain department, location, or other subgroup. Addressable devices belonging to the same subgroup may use the same timeslot number.

As illustrated at 206, a start time for commencing an action may be determined by each addressable device. According to some embodiments of the invention, an offset time may be determined based on the determined timeslot number and the length of the timeslot. The offset time may define the amount of time each addressable device delays commencement of an action from the beginning of the time period allotted for performing the action. Adding the offset time to the beginning of the time period may result in the staggered start time for each device. Then, as depicted at 208, the device may commence with the action at the designated staggered start time.

Figure 3:
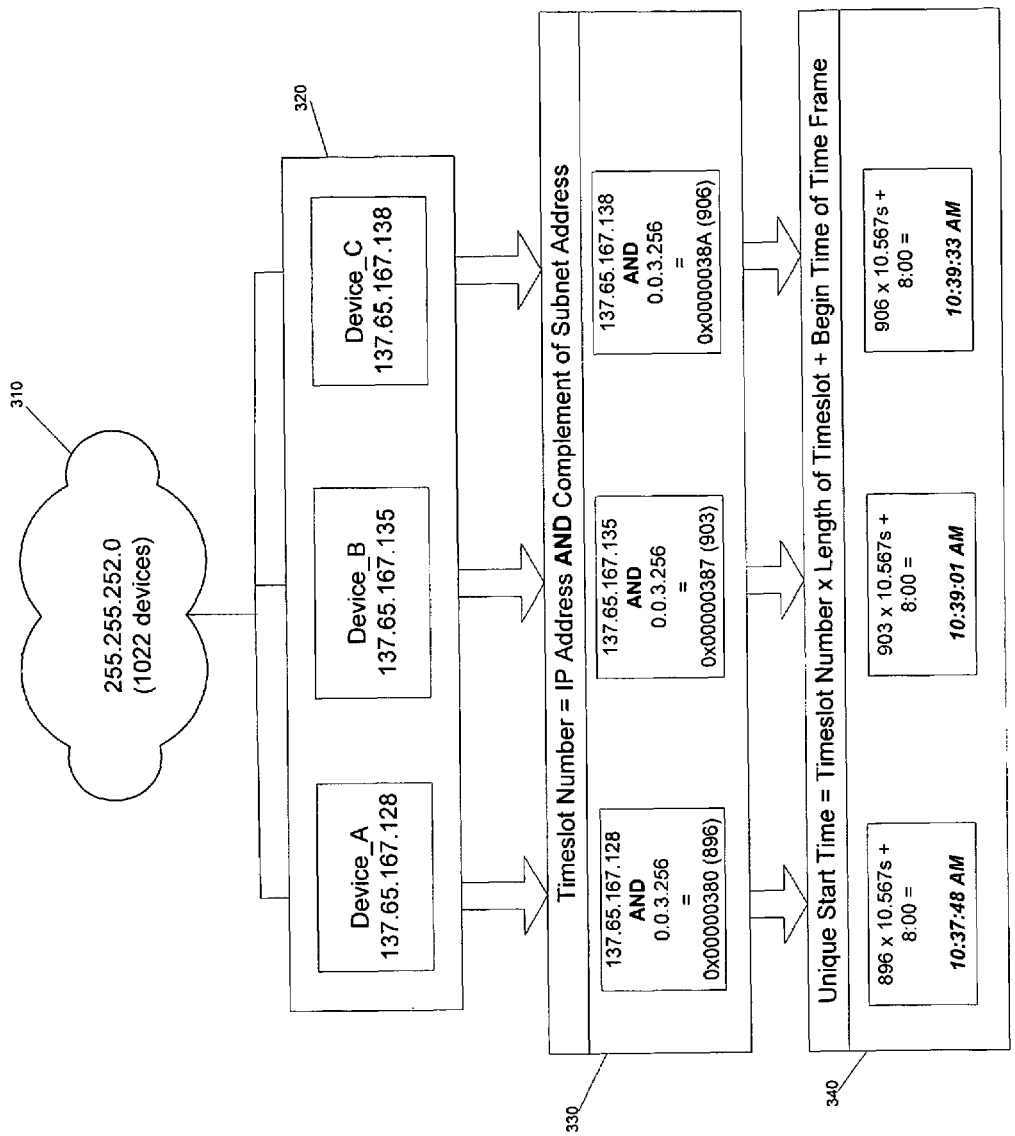
FIG. 3 illustrates an example of an operation to stagger the commencement of scheduled actions, according to various embodiments of the invention.

FIG. 3 depicts an exemplary embodiment of the invention related to a group of addressable devices belonging to a network 310. An Action_A may need to be performed by each addressable device between 8:00 AM and 11:00 AM. Network 310 may be an IP network having a subnet address of 255.255.252.0, representing 1022 potential addressable devices on the network. As depicted at 320, Device_A may have associated with it an IP address 137.65.167.128, Device_B an address of 137.65.167.135, and Device_C an address of 137.65.167.138, as illustrated at 320. The remaining devices on the network may also be assigned unique IP addresses.

As discussed above and illustrated at 330, a timeslot number for each device may be calculated based on the IP address associated with the device and a common characteristic associated with the network. In FIG. 3, the common characteristic is designated as the subnet address. In calculating a timeslot number, a logical operation, such as an AND operation, may be performed by each device between the IP address and the complement of the subnet address, in accordance with an embodiment of the present invention. For Device_A, performing an AND operation between the IP address 137.65.167.128 (0×8941A780) with the complement of the subnet address results in a timeslot number of 896. Similar calculations may be performed for the remaining devices.

A unique start time for each device may be determined, as illustrated at 340, based on the calculated timeslot number and the length of each timeslot. For example, the timeslot number may be multiplied by the length of the timeslot to derive an offset time. The offset time may represent the amount of time the device should delay in commencing the action from the beginning of the time period. Adding the offset time to the beginning of the time period results in a unique staggered start time for each device. Using Device_A, of FIG. 3 as an example, the timeslot number 896 multiplied by the 10.567s timeslot length yields an offset time of 9468.49s. Adding the offset time to the beginning of the time frame, 8:00 AM, results in a staggered start time for Device_A to perform Action_A at 10:37:48 AM.

Figure 4:
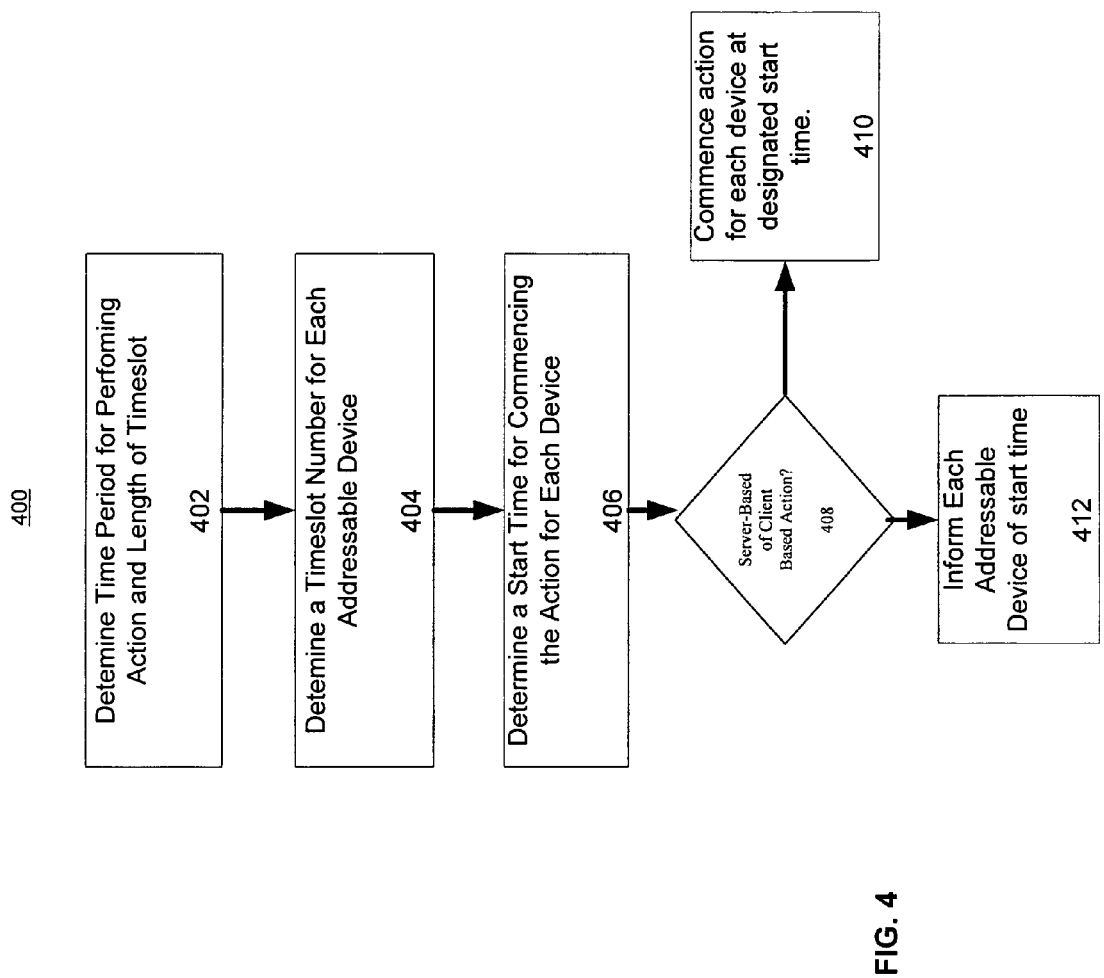
FIG. 4 illustrates a process for determining commencement times for scheduled actions at a central location, according to various embodiments of the invention.

According to some embodiments of the invention, start times may be determined for each addressable device in the group of addressable devices at a central server, such as server 110. FIG. 4 illustrates a process 400 for determining commencement times for each addressable device at a central server. A mechanism at the server may determine a time period in which an action is to be determined, as depicted at 402. This information may be obtained, for example, by consulting a list of scheduled actions which may be stored at the server. The time period may be divided into timeslots of a specific length based at least in part on the number of addressable devices in the group. For example, the group may be a network of addressable devices sharing a common subnet address. The subnet address may be used to determine the number of devices in the network.

Some addressable devices in the group may not need to perform a specified action or may be disconnected during the time period for performing the action. According to some embodiments in the invention, these devices may not be considered when determining the length of the timeslots. For example, the server may cause a polling operation to be performed for all devices in the group. The polling operation may contact each device to determine whether the device is connected. In other embodiments, all devices in the group may be used in determining the timeslot lengths.

As depicted at 404, a timeslot number may be determined for each addressable device. The timeslot number may be determined based, in part, on one or more of a unique characteristic associated with each device and a common characteristic associated with the group. For example, as noted above, for a group of computers belonging to a network, the common characteristic may be the subnet address. The unique characteristic may be a network address associated with the addressable device, such as an internet protocol (IP address). According to some embodiments of the invention, a unique timeslot number may be determined by each addressable device. In other embodiments, timeslot numbers may be shared by two or more addressable devices in the group. For example, addressable devices may belong to one or more subgroups such as a certain department, location, or other subgroup. Addressable devices belonging to the same subgroup may use the same timeslot number.

As illustrated at 406, a staggered start time for commencing an action may be determined for each addressable device. According to some embodiments of the invention, an offset time may be determined based on the determined timeslot number and the length of the timeslot. The offset time may define the amount of time each addressable device delays commencement of an action from the beginning of the time period allotted for performing the action. Adding the offset time to beginning of the time period may result in the staggered start time for each device.

A test may be performed to determine whether the action to be performed is server-based or client-based, as illustrated at 408. An action may be server-based if, for example, the server is responsible for providing the tools needed to perform the action or is otherwise based under the control, supervision, or execution of the server. An action may be client-based, for example, if the addressable client device is able to perform the action without tools from the server or without the control, supervision, or execution of the server.

As illustrated at 410, the server may initiate commencement of a server-based action at the designated time for each addressable device at the designated staggered start time. The addressable device may or may not be notified of the action. As illustrated at 412, the server may notify each addressable device of the time that has been designated to that addressable device for commencing the client based action.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for staggering one or more scheduled common actions to be performed on a predetermined number of addressable devices that form a group within a network, comprising:

determining a length of a time period over which to perform each of the one or more scheduled common actions on the predetermined number of addressable devices in the group;

dividing the length of the time period by the predetermined number of addressable devices in the group to determine a timeslot length;

determining a unique characteristic associated with each of the addressable devices in the group and further determining a common characteristic associated with the network, wherein the unique characteristic comprises an Internet Protocol (IP) address and wherein the common characteristic comprises a subnet address;

performing, for each addressable device in the group, a logical AND operation between the IP address of the addressable device and a complement of the subnet address, wherein the logical AND operation between the IP address and the complement of the subnet address results in a unique timeslot number for the addressable device; and determining, for each addressable device in the group, a unique start time for commencing the one or more scheduled actions on the addressable device, wherein determining the unique start time for each addressable device in the group comprises:

multiplying the unique timeslot number for the addressable device by the timeslot length to derive an offset time for the addressable device; and adding the offset time for the addressable device to a beginning of the time period to determine the unique start time for the addressable device.

2. The method of claim 1, wherein determining the unique start time for each addressable device in the group further comprises evenly staggering the start times within the time period.

3. The method of claim 1, wherein determining the unique start time for each addressable device in the group further comprises unevenly staggering the start times within the time period.

4. The method of claim 1, wherein the one or more scheduled common actions include one or more of installing a software application, installing an upgrade, installing a patch, running a virus scan program, or performing maintenance on each addressable device in the group.

5. The method of claim 1, wherein each addressable device is individually configured to determine the unique start time and communicate the unique start time to server.

6. The method of claim 1, wherein the group includes two or more subgroups and wherein determining the unique start time for each addressable device in the group further comprises determining a unique start time for each of the subgroups.

7. An addressable device enabled to determine a unique start time for commencing an action, wherein the addressable device is part of a group within a network that includes a predetermined number of addressable devices and wherein the action is a common action to be performed by each of the predetermined number of addressable devices in the group, the addressable device comprising:
   a notification mechanism configured to receive a notification of the action to be performed, wherein the notification includes a time period within which to perform the action and a timeslot length based on the predetermined number of addressable devices in the group; and
   a scheduling mechanism configured to:
      perform a logical AND operation between an IP address of the addressable device and a complement of a subnet address associated with the network, wherein the logical AND operation between the IP address and the complement of the subnet address results in a unique timeslot number for the addressable device;
      multiply the unique timeslot number for the addressable device by the timeslot length to derive an offset time for the addressable device; and
      add the offset time to a beginning of the time period to determine the unique start time for commencing the action on the addressable device.

8. A computer implemented system for staggering the commencement of a scheduled action to be performed on a predetermined number of addressable devices that form a group within a network, the computer implemented system comprising at least one processing device configured to:
   maintain a list of scheduled actions, wherein the list includes a time period over which to perform the scheduled action on the predetermined number of addressable devices in the group;
   determine a length of a time period over which to perform the scheduled action on the predetermined number of addressable devices in the group;
   divide the length of the time period by the predetermined number of addressable devices in the group to determine a timeslot length;
   determine a unique characteristic associated with each of the addressable devices in the group and further determine a common characteristic associated with the network, wherein the unique characteristic comprises an Internet Protocol (IP) address and wherein the common characteristic comprises a subnet address;
   perform, for each addressable device in the group, a logical AND operation between the IP address of the addressable device and a complement of the subnet address, wherein the logical AND operation between the IP address and the complement of the subnet address results in a unique timeslot number for the addressable device;
   determine, for each addressable device in the group, a unique start time for commencing the scheduled action on the addressable device, wherein determining the unique start time for each addressable device in the group comprises:
      multiplying the unique timeslot number for the addressable device by the timeslot length to derive an offset time for the addressable device; and
      adding the offset time for the addressable device to a beginning of the time period to determine the unique start time for the addressable device.

9. The computer implemented system of claim 8, the at least one processing device further configured to:
   notify each addressable device of the respective unique start time determined for the addressable device; and
   commence the scheduled action on each addressable device at the determined unique start time.

10. The method of claim 1, wherein a server is configured to determine the unique start time for each addressable device in the group and notify each addressable device of the unique start time.

11. The addressable device of claim 7, wherein the scheduling mechanism is further configured to communicate the unique start time to a server.

* * * * *